Jan. 25, 1966  D. C. HORNEY  3,231,294
CONVERTIBLE COUPLER
Filed Jan. 4, 1963

*INVENTOR*
DAVID C. HORNEY
BY
*John C. Thompson*
ATTORNEY

United States Patent Office 3,231,294
Patented Jan. 25, 1966

3,231,294
CONVERTIBLE COUPLER
David C. Horney, Waterloo, Iowa, assignor to Deere & Company, Moline, Ill., a corporation of Delaware
Filed Jan. 4, 1963, Ser. No. 249,427
13 Claims. (Cl. 280—415)

The present invention relates generally to agricultural implements and more particularly to means for coupling implements to tractors having a power-operated three-point hitch, in which the tractor carries upper and lower vertically and laterally swingable hitch links, the rear ends of which are adapted to be connected with any one of a number of different available implements, and in which power means is provided for raising and lowering the links to raise and lower the implement associated therewith.

The object and general nature of this invention is the provision of a new and improved coupler frame assembly especially constructed and arranged to be connected to the rear ends of upper and lower hitch links of the tractor and provided with means engageable with a companion frame carried by and normally forming a part of the implement, the coupler frame and companion implement frame having cooperating means whereby the tractor, when equipped with a coupler frame, may be backed into operative relationship with the implement and the draft links operated to raise the implement, or at least the front portion thereof.

More specifically, it is an object of this invention to provide a coupler frame assembly having two spaced apart lower hook portions and an upper centrally located hook portion, in which the spacing between the lower hook portions may be varied and also in which the vertical distance between the upper hook member and the lower hook members may also be varied.

Heretofore when it has been desirable to work with implements having hitch points of different categories, that is, having different spacings between the lower hooks and also different vertical spacings between the lower hooks and the upper hook, it has been necessary to provide different couplers for each category of implement. Therefore, it is an object of this invention to eliminate the necessity of providing different couplers for each different category of implement by providing a single coupler frame assembly which may be assembled in varying ways to receive implements of different categories.

A further object of this invention is the provision of a method for converting a hitch of one category to another category.

These and other objects and advantages of the invention will be apparent to those skilled in the art after a consideration of the following detailed description, taken in conjunction with the accompanying drawings, in which.

Figure 1:
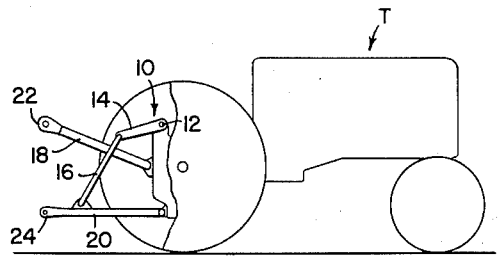
FIG. 1 is a side view, diagrammatic in nature, illustrating a farm tractor of the type adapted to receive the coupler frame of this invention.

Referring first to FIG. 1, the tractor T with which this invention is particularly adapted to cooperate is of the usual construction and includes a power lift mechanism 10 carried at the rear portion of the tractor and having an upper link 18 and a rockshaft 12 carrying a pair of lift arms 14 which are connected through lift links 16 to raise and lower a pair of lower hitch links 20, which constitute the principal portions of the conventional three-point hitch linkage with which many tractors today are equipped. The links 18 and 20 are connected at their forward ends with the rear portions of the tractor T for both vertical and horizontal movement, and the rear ends of the links 18 and 20 are provided with implement-connecting sections 22 and 24, respectively, that are apertured or otherwise formed to receive the hitch pins carried by those implements that are adapted to be connected with the tractor T.

The coupler frame, indicated in its entirety by the reference numeral 26, comprises a transverse bight 28 and two depending legs 30, 32 which may be alternately connected to either end of the transverse bight 28.

The transverse bight 28 is provided with a centrally disposed hook 42 which is adapted to receive the upper hitch pin of the implement. The bight is also provided with two upstanding lugs 44, 46 which receive the implement-connecting section 22 of the upper link 18, the lugs being apertured to receive a pin 48 which is passed through the aperture and the connecting section 22 to secure the upper link to the top surface of the bight 28. The bight terminates at its left and right hand ends in suitably apertured vertically extending end surfaces 38, 40, respectively.

Figure 5:
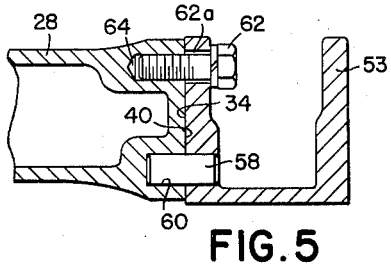
FIG. 5 is a sectional view taken along the line 5—5 in FIG. 3.

The legs 30, 32 have upper portions 51, 53, lower portions 50, 52, and connecting intermediate portions 54, 56, respectively. The lower portion of each of the legs is offset with respect to its upper portion, the leg 30 having its lower portion 50 offset to the left when viewed from the rear, and the leg 32 having its lower portion 52 offset to the right. As can best be seen from FIGS. 2 and 5, the legs are generally channel shaped and means, indicated generally at 25, are provided in the lower portion of the channel sections to receive the implement-connecting sections 24 of the lower hitch links 20. The lower portions 50, 52 are provided with rearwardly disposed lower hooks 50a, 52a, respectively, adapted to receive the lower hitch pins of the implement.

A latching mechanism, such as that shown in the patent to Hess, 2,979,137, or the patent to Hess and Horney, 3,048,228, may be used in conjunction with the legs 30, 32 to hold the lower hitch pins of the implement within the hooks 50a, 52a.

The upper portions 51, 53 of the legs 30, 32 respectively, are provided with two opposed sides 34, 36. The sides are parallel to each other and are suitably apertured, the apertures in side 34 being disposed above the apertures in the side 36. The apertured sides are adapted to cooperate with the planar vertically extending end surfaces 38, 40 of the transverse bight 28. The intermediate portions 54, 56 are disposed at an angle to the plane of the sides 34, 36, and the side 36 is disposed on that side of the leg to which the intermediate portion is angled. For example, when the coupler 26 is assembled with the portions 54, 56 angled outwardly, as shown in FIG. 3, the sides 36 are disposed on the outside.

Figure 2:
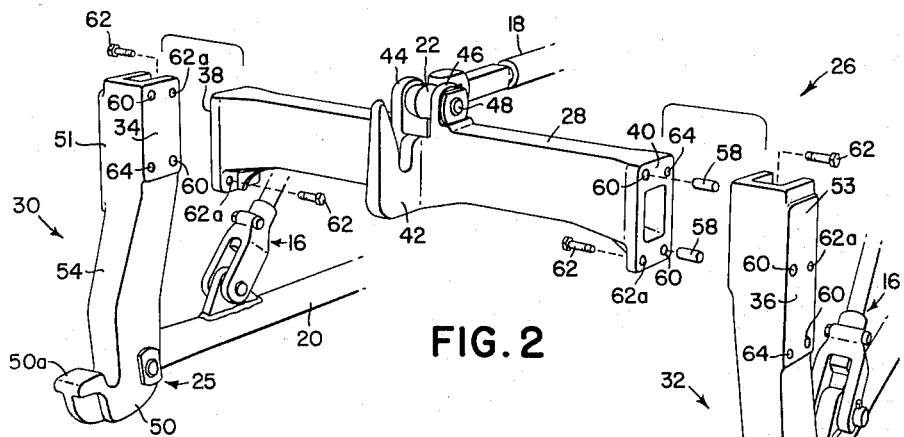
FIG. 2 is an exploded perspective view of the coupler frame of this invention.
Figures 3, 4:
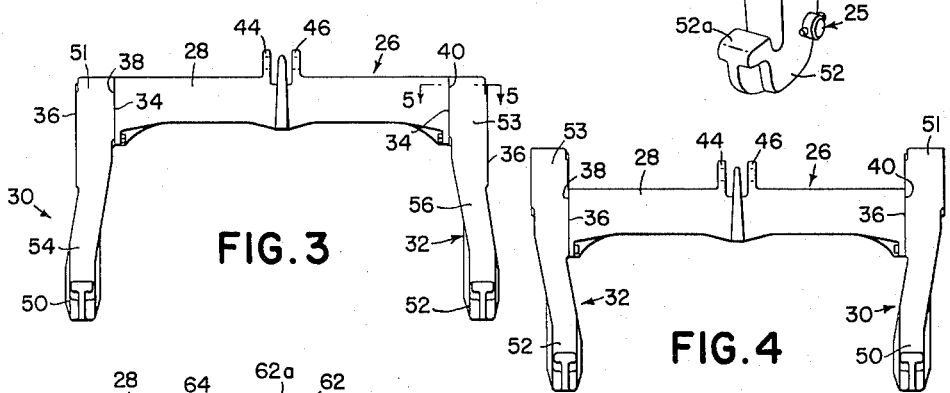
FIG. 3 is a rear view showing the coupler frame in its enlarged position.
FIG. 4 is a view similar to FIG. 3 showing the coupler frame in its reduced position.

When it is desirable to assemble the coupler frame 26 in its larger category size where the frame is capable of receiving implements having their hitch pins spaced the greatest distance apart, the leg 30 is positioned to the left of the bight portion 28, and the leg 32 is positioned to the right of the bight portion 28 as shown in FIGS. 2 and 3. The faces 34 of the legs 30, 32 are placed in face-to-face contact with the end surfaces 38, 40, respectively, of the bight 28 and are positioned by aligning pins 58, which may be disposed in any suitable manner in holes 60. To secure the legs 30 and 32 to the bight portion 28 it is only necessary to pass the bolts 62 through their corresponding apertures 62a and secure them in the bolt-receiving holes 64.

To convert the coupler frame from its larger category size illustrated in FIG. 3 to its smaller category size illustrated in FIG. 4 it is only necessary to remove the bolts 62 and reposition the leg members so that the faces 36 of the leg members 30, 32 are in face-to-face contact with the ends 40, 38, respectively and then to resecure the members in their new position in the manner set forth above. Since the bolt and pin receiving apertures 60, 62a, 64 are positioned lower on faces 36 than are the corresponding apertures on the face 34 the hook portion 42 will be in effect lowered vertically with respect to the hooks 50a, 52a.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. An inverted generally U-shaped coupler frame comprising: a transverse bight having opposite end portions, two separable legs depending from said end portions, each of said legs having an upper portion and a lower portion, the lower portion of said legs being provided with rearwardly facing means adapted to receive portions of an implement, and coupling means between the end portions and said upper portions for mounting each of the legs on the bight in one of two positions, the parts being so arranged and constructed that in one of the aforesaid positions, the rearwardly facing means on the two legs are one determinable distance apart from each other and in the other of the aforesaid positions the rearwardly facing means are a second determinable distance apart.

2. The invention set forth in claim 1 in which an intermediate portion of the bight is provided with rearwardly facing means to receive a second portion of the implement.

3. An inverted generally U-shaped coupler frame comprising: a transverse bight having opposite end portions, connection means on each of said end portions, two separable legs depending from said end portions, each of said legs having an upper portion and a lower portion, the lower portions of said legs being provided with rearwardly facing means adapted to receive portions of an implement, the upper portion of said legs being provided with connection means, the connection means on each of said end portions and said upper portions being so constructed that said upper portions may be attached in one of two positions, and coupling means to attach said legs to said bight, the parts being so arranged and constructed that in one of the aforesaid positions the rearwardly facing means on the two legs are one determinable distance apart from each other and in the other of the aforesaid positions the rearwardly facing means are a second determinable distance apart.

4. The invention set forth in claim 3 in which an intermediate portion of the bight is provided with rearwardly facing means to receive a second portion of the implement.

5. An inverted generally U-shaped coupler frame comprising: a bight having opposite ends, two separable legs, each of said legs having opposed connecting means on its upper portion and rearwardly facing means on a lower offset portion of the leg adapted to receive a portion of the implement, and coupling means to attach the legs to said bight, the connecting means on the legs being so related to the bight that in one position of attachment the implement-receiving means on the legs are one determinable distance apart, while when the legs are in an interchanged position the implement-receiving means are a second determinable distance apart.

6. An inverted generally U-shaped coupler frame comprising: a transverse bight having opposite ends and means on a portion of the bight between the ends to receive a first portion of the implement, two separable legs depending from the ends of said bight, each of said legs being provided with opposed parallel planar vertically extending side portions on the upper portion thereof, each of said side portions being adaptable to be placed in face-to-face contact with an end of the bight for securement thereto, rearwardly disposed means on the lower portion of each of said legs to receive a second portion of the implement, and means to secure said legs to the ends of said bight, the parts being so arranged and constructed that when one of said side portions is secured to an end of the bight the rearwardly disposed means on the lower portion of the leg is spaced one determinable distance away from the center of the bight, and when the other of the side portions is secured to an end of the bight the rearwardly disposed means is spaced a second determinable distance away from the center of the bight.

7. The invention set forth in claim 6 in which the lower portions of the legs are laterally offset with respect to the upper portions, one lower portion being offset to the left and the other portion being offset to the right.

8. The invention set forth in claim 7 in which each of the legs is provided with an intermediate portion that is disposed at an angle to the plane of the sides in the upper portion.

9. An inverted generally U-shaped coupler frame comprising: a transverse bight provided with right and left end portions, two detachable legs depending from the end portions of the bight, each of said legs being provided with surface means to abuttingly engage either of said end portions and a lower offset portion having rearwardly facing means adapted to receive a portion of an implement, and means to secure said legs to said bight, the parts being so arranged and constructed that when the legs are in one assembled position with one leg secured to the right end portion of the bight and the other leg secured to the left end portion of the bight the rearwardly facing means on said legs are one determinable distance apart, and when said legs are secured to the other end portions the rearwardly facing means are a second determinable distance apart.

10. An inverted generally U-shaped coupler frame comprising: a transverse bight, and two depending separable legs, said bight being provided with a centrally located hook for receiving the upper hitch pin of an implement, and vertically disposed end faces adapted to be secured to said legs, each of said legs being provided with a lower sidewardly offset portion having a lower implement hitch pin receiving hook thereon, one of said offset portions being offset to one side and the other of said offset portions being offset to the other side, upper portions of said legs being provided with oppositely disposed parallel faces having means thereon cooperable with the end faces of said bight for securement thereto, that face on the side to which the lower portion of the leg is offset having said means positioned lower than on the opposite of said sides.

11. An inverted generally U-shaped coupler frame comprising: a transverse bight and two separable legs depending from said bight, said bight being provided with a centrally located rearwardly disposed hook for receiving the upper hitch pin of an implement and generally vertically disposed end faces adapted to be secured to an upper portions being provided with rearwardly disposed hooks adapted to receive the lower hitch pins of an implement, each of said upper portions being provided with oppositely disposed parallel side faces having means thereon cooperable with the end faces of said bight for securement thereto, and said intermediate portions being disposed at an angle to said side faces, one of said intermediate portions being angled to the left and the other intermediate portion being angled to the right, the side face on that side to which the intermediate portion is angled being disposed lower than the other side face.

12. The method of converting a coupler frame having relatively widely spaced lower implement-receiving hooks to a coupler frame having relatively closely spaced implement-receiving hooks, said coupler frame having a transversely disposed bight and depending legs secured to the end portions of said bight, said depending legs having rearwardly facing hooks on lower portions which are angled in opposite directions; said method comprising the steps of initially disconnecting each of said legs from the bight portion, switching the legs whereby that leg which was initially positioned adjacent the right end of the bight portion is then positioned adjacent the left end of the bight portion and that leg which was positioned adjacent the left end of the bight portion is then positioned adjacent the right end of the bight portion with the hooks of both legs still facing rearwardly, and securing each of said legs to the ends of the bight while they are in their switched position whereby the implement-connecting points on the legs are spaced more closely together.

13. The method of converting a coupler frame having a central transversely disposed bight portion and first and second legs each having an upper portion and a lower offset portion having a rearwardly facing hook, the lower offset portion of the first leg being offset to the right, and the lower offset portion of the second leg being offset to the left, the upper portion of the first leg being initially secured to the left end of the bight portion and the upper portion of the second leg being initially secured to the right end of said bight portion whereby the offset portions project inwardly to a relatively closely spaced together position, said method comprising the steps of: disconnecting the upper portions of both legs from the ends of the bight portion to which they are initially secured, interchanging said legs, and resecuring the first leg to the right end of the bight and the second leg to the left end of the bight with the hooks facing rearwardly whereby the lower offset implement-receiving hook-portions project outwardly to a relatively widely spaced apart position.

References Cited by the Examiner

UNITED STATES PATENTS

| 2,979,137 | 4/1961 | Hess | 172—272 |
| 3,003,790 | 10/1961 | Brown | 280—415 |
| 3,066,952 | 12/1962 | Price | 280—415 |

FOREIGN PATENTS 1,134,235   8/1962   Germany.

BENJAMIN HERSH, *Primary Examiner.*

A. HARRY LEVY, *Examiner.*

UNITED STATES PATENT OFFICE
CERTIFICATE OF CORRECTION

Patent No. 3,231,294            January 25, 1966

David C. Horney

It is hereby certified that error appears in the above numbered patent requiring correction and that the said Letters Patent should read as corrected below.

Column 4, line 63, for "acen-" read -- a cen- --; same column 4, lines 66 and 67, strike out "portions" and insert instead -- portion of said legs, each of said legs being provided with upper, intermediate, and lower portions, said lower portions --.

Signed and sealed this 31st day of January 1967.

(SEAL)
Attest:

ERNEST W. SWIDER
Attesting Officer

EDWARD J. BRENNER
Commissioner of Patents